July 9, 1946.  W. A. NEUMANN  2,403,875
STUFFING BOX
Filed May 11, 1944
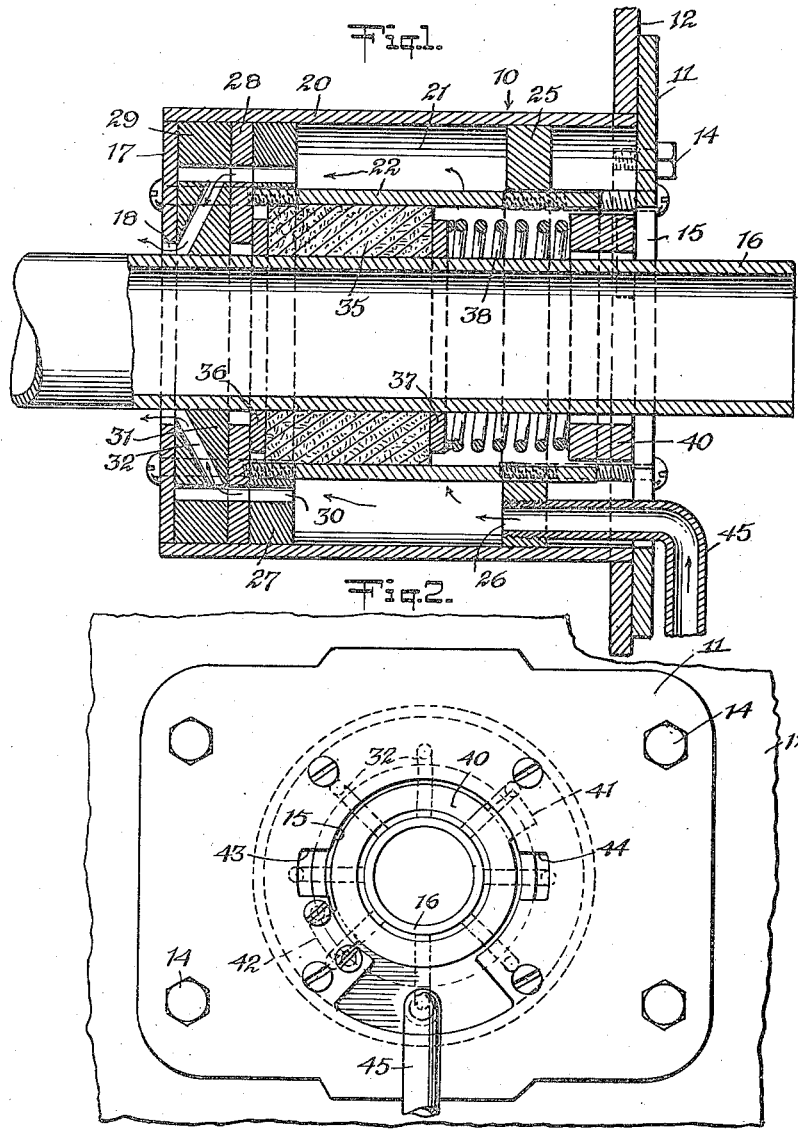
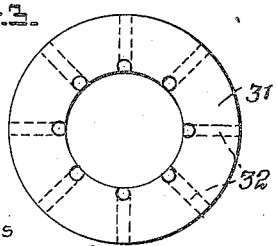
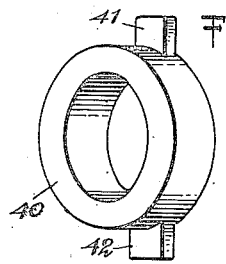
INVENTOR.
William A. Neumann
BY
Munn, Liddy & Glaccum
Attorneys Patented July 9, 1946

2,403,875

UNITED STATES PATENT OFFICE 2,403,875

STUFFING BOX

William A. Neumann, Rego Park, N. Y.

Application May 11, 1944, Serial No. 535,177

1 Claim. (Cl. 286—27)

This invention relates to stuffing boxes and more particularly to a stuffing box adapted to be used in an installation where pressure on one side of the box is involved. While my device is not limited in its use it is particularly adaptable to introducing a steam pipe into a boiler for operating a soot blower.

In the conventional installations steam pipes are introduced into the side of a boiler to blow soot from the tubes. These pipes are usually rotated and there are accordingly certain clearances necessary to allow for the rotation. Where a boiler is operated under forced draft or pressure there is a tendency for the soot to blow back along the line of the blower and to grind the packing about the steam pipe and thus destroy it within a very short period of time.

An object of this invention is to provide a stuffing box which may be used in any number of installations and which will have means to prevent soot, dirt or other objects from penetrating into the packing and thus destroying it.

Another object is to provide a stuffing box which, while simple in construction, will give additional wear.

Another object is to provide a stuffing box which will prevent gases from escaping from a boiler.

Other objects and advantages of my invention will appear from the accompanying drawing and description.

In the drawing—

Figure 1 is a sectional elevation of a stuffing box embodying my invention;

Fig. 2 is a side elevation showing the box fixed to the side of a boiler;

Fig. 3 is a detailed view of the nozzle ring;

Fig. 4 is a perspective view of the spring gland.

Referring more particularly to the drawing, my stuffing box 10 includes a support plate 11 adapted to be fastened to a boiler 12 by bolts 14. The support plate 11 has an opening 15 through which extends the steam pipe 16. At the other end of the box is a plate 17 having an opening therein 18 slightly larger than the pipe 16. Surrounding the box is a tubular member 20 and mounted therein and defining with the tubular member 20 an air space 21 is another tubular member 22. Mounted about the member 22 is a support ring 25 having at the bottom thereof a threaded opening 26. An additional support ring 27 is also provided as is a nozzle block 28 and a ring spacer 29. The support ring 27 and the nozzle block 28 are provided with a series of registering air holes to form a plurality of passages 30.

Mounted within the ring spacer 29 is a nozzle ring 31 having a plurality of openings 32 extending diagonally through its surface and communicating with the passage 30 and the opening 18 in the plate 17. Suitable packing 35 such as asbestos rope is introduced about the pipe 16 within the tube 22 between the packing rings 36 and 37 and a spring 38 is provided to hold the packing tightly in place. Spring 38 is controlled by the spring gland 40 upon which are mounted two lugs 41 and 42 which will register with the openings 43 and 44 in the support plate.

It will be seen that by turning the spring gland until the lugs register with the openings the gland, spring and packing may be removed.

Fastened in the opening 26 of the support ring 25 is a pipe 45 which communicates through the opening 26 with the chamber 21. It will be seen that air may be forced from the pipe 45 into the chamber 21 through the passage 30, the opening 32 around the pipe 16 to exert pressure equal to or greater than the internal pressure and thus to prevent foreign matter from working into the packing. Where my device is used in a boiler under forced draft the pipe 45 takes air directly from forced draft fan and whenever the boiler is in operation continues to blow foreign matter away from the stuffing box regardless of whether or not steam is being introduced through the pipe 16 to clean the soot from the tubes. This prevents foreign matter from working in around the packing, and thus prevents its disintegration due to this cause which is common in conventional installations.

I claim:

A stuffing box for a movable tubular member, said stuffing box comprising a supporting plate having a central opening therein through which said movable member extends, a pair of cylindrical members attached to said supporting plate, one within the other, concentrically with each other and with the movable member, said cylindrical members being spaced from each other and from said movable member, the inner of said cylindrical members being shorter than the outer cylindrical member, spring pressed packing between said movable member and said inner cylindrical member, a pair of spaced spacer rings maintaining the spaced relationship between said cylindrical members and forming an annular chamber between them, a nozzle block, a nozzle ring and a retaining plate mounted in the free end of said outer cylindrical member adjacent one of said spacer rings and the free end of said inner cylindrical member, the retaining plate having a central orifice through which said movable member extends and which provides an annular space between said retaining plate and said movable member, registering passages in said nozzle block and nozzle ring which afford communication between said annular space and said annular chamber, and means for introducing air under pressure into said annular chamber.

WILLIAM A. NEUMANN.